(12) United States Patent
Mishra et al.

(10) Patent No.: US 9,910,743 B2
(45) Date of Patent: Mar. 6, 2018

(54) METHOD, SYSTEM AND DEVICE FOR VALIDATING REPAIR FILES AND REPAIRING CORRUPT SOFTWARE

(71) Applicant: MICROSOFT TECHNOLOGY LICENSING, LLC, Redmond, WA (US)

(72) Inventors: Abhinav Mishra, Redmond, WA (US); Michael Day, Kirkland, WA (US); Charles Keen, Seattle, WA (US); Mingbiao Fei, Sammamish, WA (US); Derek Rivait, Redmond, WA (US); Alan B. Back, Redmond, WA (US); Rainer Sigwald, Norman, OK (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 185 days.

(21) Appl. No.: 14/855,236

(22) Filed: Sep. 15, 2015

(65) Prior Publication Data

US 2016/0004606 A1    Jan. 7, 2016

Related U.S. Application Data

(63) Continuation of application No. 12/958,267, filed on Dec. 1, 2010, now Pat. No. 9,158,605.

(51) Int. Cl.
*G06F 9/44* (2006.01)
*G06F 11/14* (2006.01)
(Continued)

(52) U.S. Cl.
CPC .......... *G06F 11/1469* (2013.01); *G06F 11/00* (2013.01); *G06F 11/0793* (2013.01);
(Continued)

(58) Field of Classification Search
CPC ...................................................... G06F 11/36
(Continued)

(56) References Cited

U.S. PATENT DOCUMENTS 6,049,612 A * 4/2000 Fielder ................. H04L 9/0869
380/44
6,108,420 A * 8/2000 Larose ..................... G06F 8/61
380/30
(Continued)

FOREIGN PATENT DOCUMENTS

CN         1485732        3/2004
CN       101021797        8/2007
(Continued)

OTHER PUBLICATIONS

Automatic Detection and Repair of Errors in Data Structures—Brian Demsky, Martin Rinard—Laboratory for Computer Science Massachusetts Institute of Technology Cambridge—OOPSLA'03, Oct. 26-30, 2003.*

(Continued)

*Primary Examiner* — Francisco Aponte
(74) *Attorney, Agent, or Firm* — L. Alan Collins; Collins & Collins Intellectual, LLC

(57) ABSTRACT

A system and method for repairing corrupt software components of a computer system. Corrupt software is detected and repaired utilizing an automated component repair service. Repair files are downloaded from an external storage location and used to repair the corruption. The downloaded files are preferably the smallest amount of data necessary to repair the identified corruption. The process of repairing corrupt files is used in conjunction with a software updating service to resolve problems that occur when corrupt software is updated by allowing a corrupt component to be (Continued)

repaired and then uninstalled such that an updated component can be properly installed.

15 Claims, 5 Drawing Sheets

(51) Int. Cl.

| | | |
|---|---|---|
| *G06F 11/00* | (2006.01) | |
| *G06F 11/36* | (2006.01) | |
| *G06F 11/07* | (2006.01) | |
| *H04L 9/32* | (2006.01) | |

(52) U.S. Cl.
CPC ............ *G06F 11/36* (2013.01); *H04L 9/3236* (2013.01); *G06F 8/68* (2013.01); *G06F 11/1433* (2013.01); *G06F 2201/84* (2013.01)

(58) Field of Classification Search
USPC .......................................................... 717/124
See application file for complete search history.

(56) References Cited

U.S. PATENT DOCUMENTS

| | | | | |
|---|---|---|---|---|
| 6,233,687 | B1 * | 5/2001 | White | G06F 21/6209 |
| | | | | 713/181 |
| 6,338,152 | B1 | 1/2002 | Fera et al. | |
| 6,430,608 | B1 * | 8/2002 | Shaio | H04L 63/102 |
| | | | | 709/217 |
| 6,567,826 | B1 * | 5/2003 | Fischer | G06F 11/0706 |
| 6,694,434 | B1 * | 2/2004 | McGee | G06F 21/565 |
| | | | | 713/182 |
| 6,757,837 | B1 | 6/2004 | Platt et al. | |
| 7,293,201 | B2 | 11/2007 | Ansari | |
| 7,337,427 | B2 | 2/2008 | Carrigan | |
| 7,523,343 | B2 | 4/2009 | Leis et al. | |
| 7,594,136 | B2 | 9/2009 | Kerner et al. | |
| 7,603,440 | B1 | 10/2009 | Grabowski et al. | |
| 7,716,660 | B2 | 5/2010 | Mackay | |
| 7,913,114 | B2 | 3/2011 | Leppard | |
| 8,074,103 | B2 * | 12/2011 | Dilman | G06F 11/0727 |
| | | | | 707/690 |
| 8,225,135 | B2 | 7/2012 | Barrall et al. | |
| 8,347,086 | B2 * | 1/2013 | Vlcan | G06F 21/31 |
| | | | | 713/161 |
| 8,528,075 | B2 | 9/2013 | Heim et al. | |
| 8,607,328 | B1 * | 12/2013 | Hodges | G06F 21/568 |
| | | | | 713/165 |
| 8,612,398 | B2 | 12/2013 | Jarrett et al. | |
| 9,324,361 | B2 * | 4/2016 | Hars | G11B 20/00086 |
| 2002/0069363 | A1 * | 6/2002 | Winburn | G06F 21/64 |
| | | | | 726/4 |
| 2002/0087914 | A1 | 7/2002 | Sarra et al. | |
| 2003/0079216 | A1 | 4/2003 | Drane et al. | |
| 2004/0093507 | A1 | 5/2004 | Courcambeck | |
| 2004/0236843 | A1 | 11/2004 | Wing et al. | |
| 2005/0055686 | A1 | 3/2005 | Buban et al. | |
| 2005/0166198 | A1 | 7/2005 | Gigliotti et al. | |
| 2005/0246612 | A1 | 11/2005 | Leis et al. | |
| 2006/0090209 | A1 | 4/2006 | Garay et al. | |
| 2006/0190773 | A1 | 8/2006 | Rao et al. | |
| 2007/0050678 | A1 | 3/2007 | Estes et al. | |
| 2007/0168708 | A1 | 7/2007 | McCuller | |
| 2007/0260919 | A1 | 11/2007 | Kerner et al. | |
| 2007/0294560 | A1 | 12/2007 | Muthukumarasamy et al. | |
| 2008/0046786 | A1 | 2/2008 | Patel et al. | |
| 2008/0162915 | A1 | 7/2008 | Price et al. | |
| 2008/0320336 | A1 | 12/2008 | Qadir et al. | |
| 2009/0199064 | A1 | 8/2009 | Radha et al. | |
| 2010/0011243 | A1 | 1/2010 | Locasto et al. | |
| 2010/0030878 | A1 | 2/2010 | Grabowski et al. | |
| 2010/0031086 | A1 | 2/2010 | Leppard | |
| 2010/0064285 | A1 | 3/2010 | Dechovich et al. | |
| 2010/0146325 | A1 | 6/2010 | John | |
| 2010/0180271 | A1 | 7/2010 | Arsenault | |
| 2011/0029805 | A1 | 2/2011 | Pericin | |
| 2011/0214021 | A1 | 9/2011 | Vidal et al. | |

FOREIGN PATENT DOCUMENTS

| | | |
|---|---|---|
| CN | 101566959 A | 10/2009 |
| JP | 2009-238227 A | 10/2009 |
| KR | 10-2006-0118464 A | 11/2006 |
| KR | 10-2008-0080399 A | 9/2008 |

OTHER PUBLICATIONS

Data Structure Repair Using Goal-Directed Reasoning—Brian Demsky and Martin Rinard—Computer Science and Artificial Intelligence Lab, Massachusetts Institute of Technology Cambridge—ICSE'05, May 15-21, 2005.*
Canadian Intellectual Property Office, CA Office Action for Application No. 2,816,814, dated Jan. 24, 2017, 5 pages, Canada.
"Third Office Action Received for Chinese Patent Application No. 201110405228.5", dated Mar. 20, 2015, 11 Pages.
"Second Office Action and Search Report Received for Chinese Patent Application No. 201110405228.5", dated Aug. 21, 2014, 17 Pages.
CN Notice on the First Office Action and Search Report for Application No. 201110405228.5, dated Dec. 25, 2013.
International Search Report and Written Opinion for International Patent Application No. PCT/US2010/060013 Nov. 2, 2011.
Chang et al., "Self-healing Strategies For component Integration Faults," http://www.lta.disco.unimib.it/lta/uploads/papers/Chang-HealigCOTS-ARAMIS-2008.pdf, Nov. 24, 2008 (8 pages).
Ghosh et al., "Self-healing systems—survey and synthesis," Decision Support Systems 42:2164-2185 (2007), http://www.som.buffalo.edu/isinterface/papers/Self-healing%20systems.pdf.
Montani et al., "Achieving Self-Healing in Service Delivery Software Systems by Means of Case-Based Reasoning," pp. 1-19 http://citeseerx.ist.psu.edu/viewdoc/download?doi=10.1.1.78.5439&rep=rep1&type=pdf, Apr. 2008.
Park et al., "Self-healing Mechanism for Reliable Computing," Int'l J Multimedia and Ubiquitous Engineering 3(2): 1-10 (Apr. 2008) http://www.serc.org/journals/IJMUE/vol3_2008_/1%20pp1-10.pdf.
Saha, G. K., "Software—Implemented Self-healing System," CLEI Electronic J 10(2):1-6 (Paper 5) (Dec. 2007), http://www.clei.cl/cleij/papers/v10i2p5.pdf.
AU Patent Examination Report No. 1 for Application No. 2010364976, dated Mar. 22, 2016.
CN Notice on Fourth Office Action for Application No. 201110405228.5, dated Sep. 25, 2015.
AU Patent Examination Report No. 2 for Application No. 2010364976, dated May 5, 2016.
Korean Intellectual Property Office, KR Notice of Preliminary Rejection for Application No. 10-2013-7013808, p. 1, dated Jul. 18, 2016, Korea.
U.S. Appl. No. 12/958,267, filed Dec. 1, 2010, Mishra.
Australian Patent Office, Author unknown, AU Notice of acceptance for patent application No. 2010364976, dated Dec. 13, 2016, 3 pages, Australia.
"Office Action Issued in European Patent Application No. 10860373.9", dated Oct. 19, 2017, 8 Pages.
"Office Action Issued in Canadian Patent Application No. 2816814", dated Sep. 21, 2017, 4 Pages.

* cited by examiner

METHOD, SYSTEM AND DEVICE FOR VALIDATING REPAIR FILES AND REPAIRING CORRUPT SOFTWARE

RELATED APPLICATIONS

This Application is a Continuation of, and claims benefit from, U.S. patent application Ser. No. 12/958,267 that was filed on Dec. 1, 2010, and that is incorporated herein by reference in its entirety.

BACKGROUND

Modern computer systems run a complex array of software, from the operating system (OS) to application programs. The OS alone may include tens of thousands of files. Related files may be grouped into software components.

It is known for users of computer systems to update the software installed on their computer systems. Updates may include fixes to bugs or security updates to prevent newly discovered potential attacks. Additionally, updates may release new features that were not included in earlier versions of the software. Regardless of the reason for an update, corrupt software components on the user's computer system may prevent software updates from installing properly.

Such corruption may have any of a number of causes. Corruption may occur because of a virus introduced into the computer system or some other attack by a malicious party. Software mis-configuration and faults in hardware components, such as memory and non-volatile storage, may also cause component corruption.

Regardless of the cause, corruption may block an update from being completed. For example, the WINDOWS' OS sold by Microsoft Corporation includes software updating services that accesses a remote service, called WINDOWS UPDATE®, to install new versions of components of the WINDOWS® operating system. An update by this service often entails uninstalling older versions of components before installing updated versions of those components. If the older versions are corrupt, the uninstall action may not be able to proceed. This will prevent the installation of the updated components, leaving the user with an out of date computer system.

SUMMARY

Improved computer system stability and reliability may be achieved with a method for repairing corrupt software. Repairing corrupt software components, for example, may allow old versions of components to be uninstalled such that updated components can be installed. Improved system stability and reliability may then result from operating the system with up to date components.

Repairing software is important any time that integrity of the software is suspect. For example, if software has been corrupted or is not working properly, the computer system would benefit from repairing the software. In particular, it is advantageous for the method of repairing software to work at the lowest level of granularity possible. For example, if a software component is found to be corrupt and in need of repair, the system should repair only the smallest set of files necessary to mend the corruption.

Regardless of the reasons for repairing corrupt software components, the repairs may be made by detecting corrupt software components and making a list of corrupt files. A set of files needed to repair the corrupt files may be located and downloaded. The corrupt component may then be repaired using the downloaded files.

In some embodiments, file corruption is detected using a hash function and a separately stored hash key. The computer system may then download a set of repair files corresponding to the corrupt files. Some embodiments include an act of validation to ensure that the repair files received by the computer system are authentic and safe to install.

In some embodiments, the method of repairing corrupt files is used in a software update process. If it is determined that a component to be updated is corrupt, the component will be repaired and uninstalled. Only then will an updated version of the component be installed.

In other embodiments, the repair of corrupt software can be triggered manually by a user. Alternatively, it may be triggered by a system health checker, such as an anti-virus software application.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
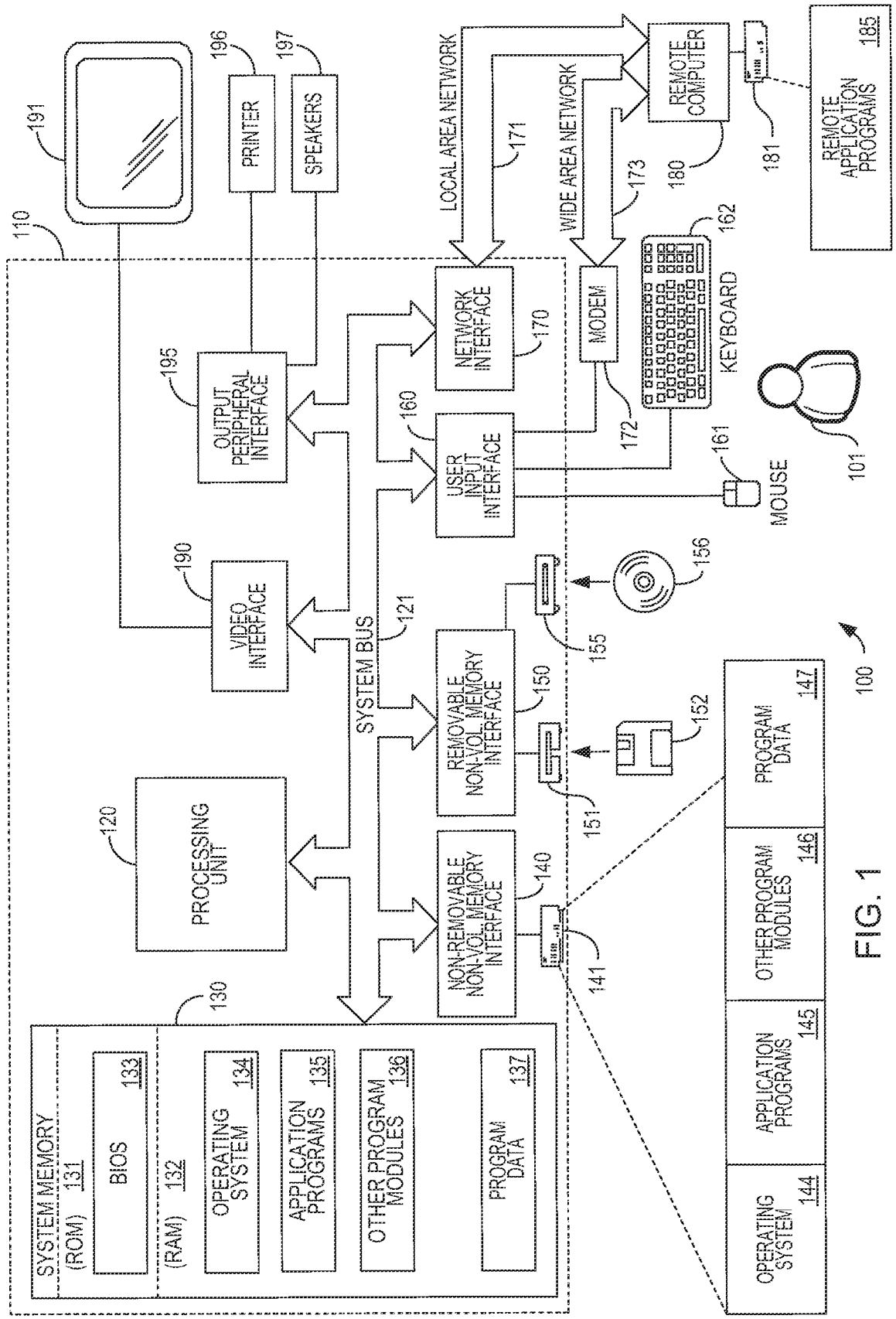
FIG. 1 is a block diagram of an exemplary environment in which embodiments of the invention may operate.

The inventors have recognized and appreciated that repairing software components that have become corrupt may facilitate updating of software components executing on a computer system and may result in a more stable and reliable computer system. The system and method presented herein can repair components with minimal involvement of the user. By using an automated repair service, user frustration may be reduced and the user may spend less time addressing issues resulting from failures that occur in the software updating process.

In some embodiments, a component repair service may execute on a computing device. That repair service may operate in response to one or more triggers, such as a failure of an updating service on the computing device to complete an update or an indication from an anti-virus or other anti-malware component indicating a possibly corrupt component or a collection of components, such as a software subsystem. Other triggers may alternatively or additionally be used. In some embodiments, the trigger may be an express request from a subsystem to be verified. In other embodiments, a trigger may be any indication that the system integrity is compromised.

Regardless of the trigger for a repair, the repair service may obtain, from a suitable source, copies of one or more files that are a part of the corrupt component. The obtained files may provide uncorrupted versions of corrupt files that are contributing to the corruption of the corrupt component. The downloaded files may be of the same version as are installed on the computing device and may be used to repair those files, possibly by replacing them.

The suitable source of the repair files may vary depending on the embodiment. In some embodiments, the source is an external server. This external may, in some embodiments, be a trusted source. It may also be validated by a validation process known in the art. It may be a server on the local network to which the computer connects. Alternatively, the source does not have to be a traditional server, but instead could be a peer to peer network source. In some embodiments, the suitable source may be an internal store or disk. The OS may keep a store of software files that may be used to repair software components even when the computer is not connected to a network. As an example, the OS developer may encourage original equipment manufacturers to ship computer hardware with a recovery zone already stored to the computer storage device.

The repaired files may then be used as part of an uninstall operation of the corrupt component. That component may then be reinstalled using uncorrupted files. The same version of the component may be reinstalled based on the repaired files, which may be the case when the goal is to repair corrupted software. Though, in some embodiments, an updated version of the component may be installed, which may be the case when the goal is to update software that was found to be corrupted.

Any suitable mechanism may be employed to identify a set of files corresponding to a corrupt component. In some embodiments, the files may correspond to a subset of the corrupt component. To identify this subset, files as they exist on the computing device may be tested to determine whether any have been corrupted. Such testing may entail using a hash function and comparing one or more hash results associated with files of the component to corresponding hash results of uncorrupted files to identify any deviations signifying corruption.

The hash results for uncorrupted files may be obtained from any suitable source. In some embodiments, a software component may be implemented with one or more packages that each includes both a manifest and a payload. The payload may be made up of files that contain computer executable instructions that are executed to perform functions of the component. The manifest may identify the files that form a part of the package and may additionally store an expected hash result for each file. Corruption may be detected, in a file, for example, by computing a hash result for the file as it exists on a computing device and comparing the computed hash result to the result in the manifest.

In some embodiments the validity of the manifest may also be checked to ensure that the hash results for files in the package or other portions of the manifest have not been corrupted. Such a check may be performed before the hash results for individual files stored in the manifest are used to test the files such that the manifest may be repaired prior to use to test the payload files. A check of the manifest may be based on a hash result stored on the computing device at the time the component was installed. For example, some operating systems employ a database, which may be called a "registry," to store information about software or hardware components installed on a computing device. Upon validating a package upon install, for example, an installation of a component may write into the registry a hash result value for each manifest associated with the component. This hash result value may be used to subsequently identify any corruption of the manifest.

Such an approach to testing the manifest and payload files separately allows portions of the component that need to be repaired to be identified and then obtained from a trusted source. Though security techniques could be used on a computing device to maintain a trusted store of back-up copies of components installed on the computing device, in some embodiments, the trusted source of components may be a server or other device external to the computing device. In some embodiments, the source of the files used to repair corrupt files on a computing device may be an update server, such as the WINDOWS UPDATE® server in computers with the WINDOWS® operating system.

Update servers conventionally provide entire packages for the computer system to download. These packages can be large and utilize a significant portion of the computer system's available bandwidth. In order to support repair of corrupt software component, an update server may allow the computing device to limit its download to the necessary files to repair the corrupt components, rather than downloading an entire update package.

The files that are downloaded can be in any suitable form. In some embodiments, only the smallest piece needed for repair is downloaded. The smallest unit available to download can be any size unit of the overall software environment being repaired. The smallest unit being downloaded may be the entire component, an individual file, or even a portion of a file that needs repair. The files downloaded need not be in any particular format. In some embodiments, the files may be encoded or encrypted. In other embodiments, the entire file may not be downloaded, but just a portion of a file.

In some embodiments, a mapping may be required to relate a specific file on a computing device to a specific unit of content that may be accessed on an external server. For example, an update server may organize files into components, which are in turn placed into packages, which are in turn organized by versions. A mapping between an identified faulty file and a unit of content that can be provided by a update server or other trusted source may be made to determine an appropriate unit or units that contain files to repair the corrupt files on a computing device. This mapping may be performed in any suitable location, including on the computing device, on the external server, or partially on each.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet computers, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Computer 110 is an example of a computing device that may selectively repair components of an operating system or other software on the computing device. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user 101 may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node. Remote computer 180 may be an example of an update server.

Remote computer 180 typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
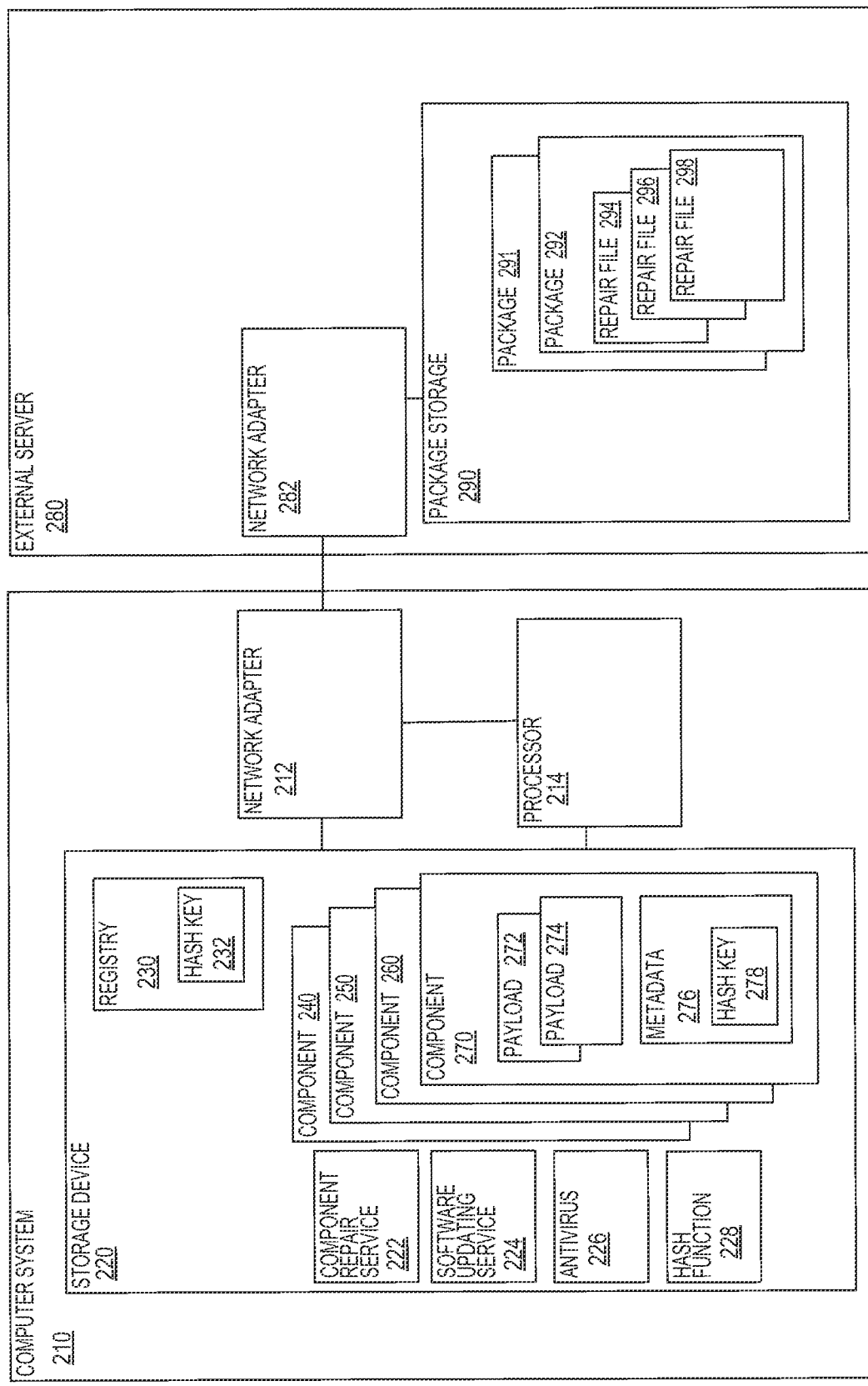
FIG. 2 is a block diagram of a computing device according to some embodiments of the present invention.

FIG. 2 illustrates portions of the computer environment 200 that are relevant to some embodiments of the invention. A computer system 210 has at least one processor 214 for executing software. The software may include operating system (OS) 134, application programs 135 and other program modules 136, as illustrated in FIG. 1. Though, it should be appreciated that the type of software executing on a computer system 210 or repaired is not critical to the invention.

The processor 214 is connected to at least one storage device 220. This storage device may be volatile memory, such as RAM 132, non-volatile memory 141, such as a hard disk drive or flash memory, or a combination of non-volatile and volatile memory. The storage device stores multiple software components 240, 250, 260 and 270. Each software component 240, 250, 260 and 270 is a collection of individual files that are related to one another. Here, a "file" may be an organized grouping of digital data stored in a predefined format in memory allocated by a file management component (not shown). Though, it should be appreciated that a "file" may be any suitable collection of data that may be manipulated, and the specific structure of such a "file" is not critical to the invention.

In the illustrated example, component 270 comprises payload files 272/274 and a metadata file 276, which may in some embodiments be implemented as a "manifest" of a component. Payload files are files that are used by the processor 214 of the computer system 210 while executing the component 270. These files may include executable files, which may sometimes be formatted as dynamically linked libraries (DLL). The metadata file 276 stores information about the payload files, such as details regarding dependencies between executables of component 270. For example, if payload 272 depends on payload 274, this will be explicitly recorded in the metadata file 276. The present invention is not limited to the aforementioned file types. Files of any suitable format may be supported and the format of the files may depend on the component being repaired.

The metadata file 276 also stores information allowing the payload files to be tested for corruption. In the illustrated embodiment, that information is in the form of one or more hash keys 278 for a hash function 228, which is also stored on the storage device 220. The hash key 278 is the result of operating hash function 228 on an uncorrupted version of payload 274. The hash function 228 is a computer-executable component that may be applied to a file to generate a hash result. This hash function 228 is preferably cryptographically secure, but is not required to be so limited. If the hash function 228 is performed upon a corrupt version of the payload 274, then the value that results from the hash function will differ from the stored hash key 278. This difference acts as a clear indication that the payload file 274 has changed in some way—and potentially in a manner that is harmful to the computer system 210.

The metadata file 276 itself may also become corrupt. Thus, it is useful to have a hash key 232 stored somewhere on the system. An example of a suitable location for storage of the hash key 232 of the metadata file 276 is in the registry 230.

Though, it should be appreciated that FIG. 2 represents just one example of an arrangement of information that allows corrupt files to be identified. In some embodiments, it is possible for the metadata to be incorporated into the payload file 274 such that there is no need for a separate metadata file 276. In this case, the hash key 278 may be embedded in the payload file 274 along with the rest of the metadata.

The storage device 220 also stores a component repair service 222. This may also be a piece of software that is preferably part of the OS 134, but may be a separate application program 135. The operation of the component repair service 222 will be discussed in conjunction with FIG. 3, which details an embodiment of a method to repair a corrupt software component.

The component repair service 222 may be initiated 302 in any one of several different ways. In some embodiments, it may be started by a user 101 that manually runs the component repair service 222. In another embodiment, the component repair service 222 may be activated by a system health checker, such as an antivirus program 226, in response to detecting a potential corruption. In yet a further embodiment, the component repair service 222 may be executed due to a failure in a software updating service 224. As already mentioned, in some cases software component 270 cannot update to a new version properly if it has become corrupt. Thus, the corrupt component 270 may be repaired by the component repair service 222 prior to the software update service 224 completing an update.

It should be appreciated that an update is just one example of a scenario in which a repair of a corrupt component may be performed. Examples of other scenarios include a software subsystem requesting to be verified. In some embodiments, repair of a corruption may be performed based on an indication from a system health checker that a potential corruption was identified. Other embodiments may choose to repair corrupt software based on any indication that the software is not working properly and causing the integrity of the system to be compromised.

As described herein, the repair service 222 and updating service 224 are separate components. In some embodiments, however, the repair service 222 may be a portion of the updating service 224. Such an embodiment may rely on existing features for accessing an external update service and suspending access to software components and any other operations that are similarly performed by the repair service and updating service.

Figure 6:
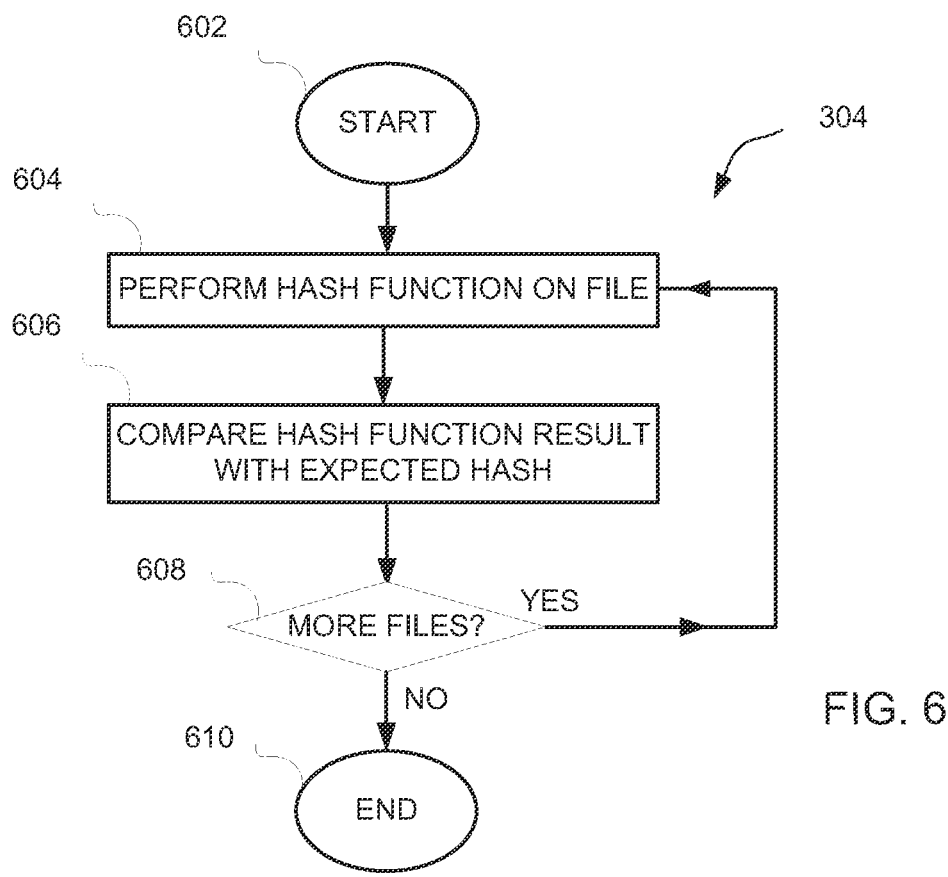
FIG. 6 is a flow chart of an exemplary process of determining whether a component is corrupt in some embodiments of the present invention.

Regardless of type of event that triggers operation of component repair service 222, once the component repair service 222 has been initiated at act 302, it will detect corrupt components at act 304. This may be accomplished with the hash function 228, as illustrated in more detail in FIG. 6. The process in FIG. 6 is initiated at 602 by the execution of the component repair service 222. As part of the illustrated process, component repair service 222 runs the hash function 228 on a file 274 that is part of the component 270 being tested at act 604. The file may represent a payload file 274, a manifest file 276 or any other suitable file. The hash value that results from operating the hash function on the file is then compared at act 606 to the stored hash key 232 in the case of a file containing a manifest 276 or key 278 in the case of a payload file 274. If the generated hash value does not match the stored hash key 278, then the file is different than the originally installed file, which is an indication of file corruption.

At act 608, the component repair service 222 checks whether there are more files to be evaluated. If there are more files to be evaluated, then it will loop back to repeat the process of hashing the next file at 604 and comparing the hash value to the hash key at 606. If there are no more files to check, then component repair service 222 will end the detection of corrupt components at act 610.

Whether there are more files to be evaluated may be determined in any suitable way and may depend on what event triggered operation of component repair service 222. In some embodiments, every component 240, 250, 260 and 270 of the computer system 210 will be checked for corruption. In other embodiments, only a selected set of components will be tested. For example, if a system health checker, such as an antivirus program 226, indicates that a specific component is possibly corrupt, then the detection of corrupt components in act 304 may only be run for the flagged components such that only the files of those components are evaluated in the process of FIG. 6.

Figure 3:
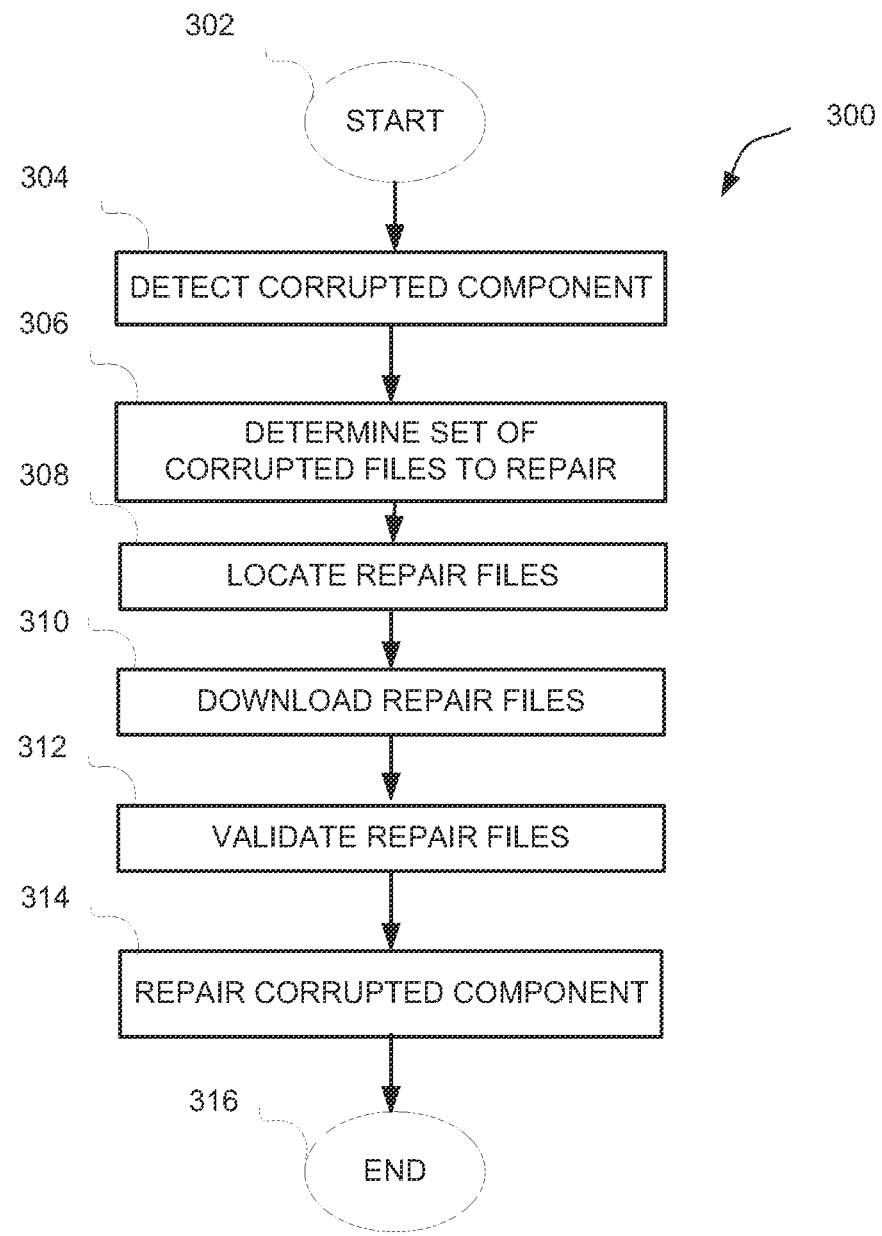
FIG. 3 is a flow chart of an exemplary process of repairing corrupt software in some embodiments of the present invention.

Regardless of which files are evaluated in the process of FIG. 6, the results of those evaluations may be used in the process of FIG. 3. At act 306, the component repair service 222 determines a set of corrupt files that need repair. It is at this point that it is determined which of the components and files that were detected as corrupt in act 304 should be repaired.

Figure 5:
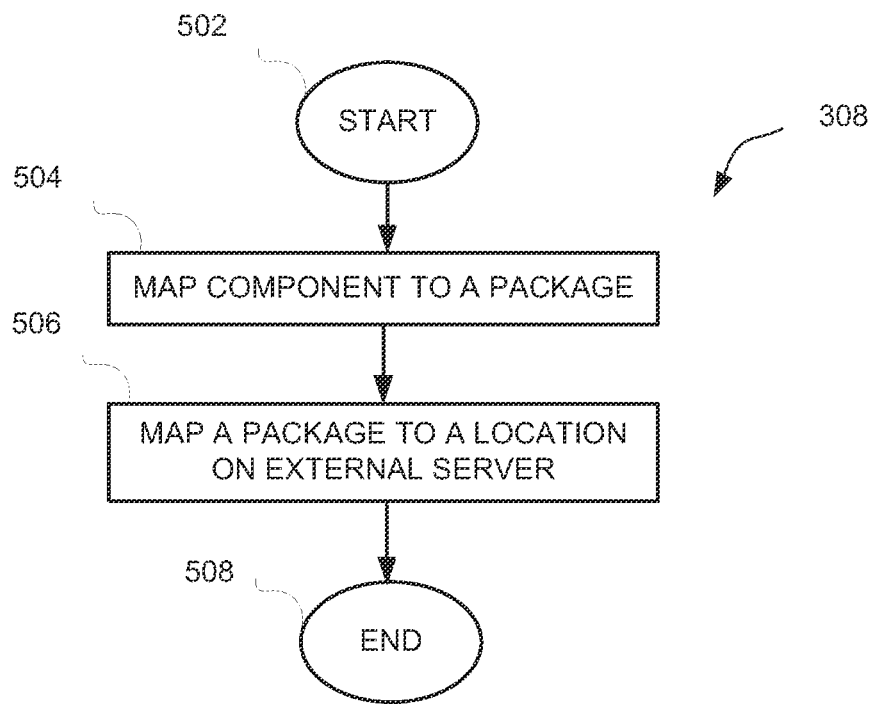
FIG. 5 is a flow chart of an exemplary process of locating repair files in some embodiments of the present invention.

The component repair service 222 locates a set of repair files 294, 296 and 298 that will be used by the computer system 210 to fix the corrupt files at act 308. These files may be located, for example, on an external server 280. FIG. 5 shows one possible embodiment of this act.

The routine starts at act 502 when the component repair service 222 initiates act 308 of FIG. 3. At act 504, the corrupt component 270 is mapped to a package 292. This mapping may allow for identification of appropriate copies of a component or individual files of a component, particularly if the source of the repair files 294, 296 and 298 organizes software in a format different than that used by component repair service 222 to identify a corrupt component. For example, external server 280 may store groups of files in packages. Also, there may be software for multiple versions of the same component, corresponding to different versions of the OS being repaired or different versions of the component itself. Regardless of the specific organization of the software on the external server, an appropriate unit of software that can be downloaded may be identified by the mapping. In the illustrated example, that unit of software is a package. The unit of software could alternatively be an individual file or component.

Once a package 292 is determined, the package must be located on the external server 280, which is accomplished in act 506. The location may be represented by a Uniform Resource Locator (URL) or some other form of data that reflects the location within package storage 290. Act 308 terminates at 508 once the location is determined.

If multiple files are to be obtained, the process of FIG. 5 may be repeated for each such file. The determined location or locations are then used as illustrated in FIG. 3. At act 310, the component repair service 222 uses the determined location or locations of all the necessary repair files 294, 296 and 298 to download the repair files, such as files 294, 296 and 298 (FIG. 2). In some embodiments, the computer system 210 uses a network adapter 212 to communicate with the external server 280, which also communicates through a network adapter 282. Network adapters as known in the art may be used for this purpose. However, there are many ways that the computer system 210 can be connected to the external server 280. It may be a direct connection, a Local Area Network, a Wide Area Network, the Internet, or an intranet. One of ordinary skill in the art would understand that any suitable connection may be used to connect the computer system 210 to the external server 280. Further, it should be appreciated that files need not be obtained from an external server. The files could also be obtained from a peer to peer network source. The source also need not be limited to an external source. In some embodiments, a local store of repair files may be stored on the computer system 210.

When the repair files 294, 296 and 298 have been received by the computer system 210 in act 310, the component repair service 222 can optionally validate the repair files 294-298 in act 312. This validation process may rely on the same cryptographically secure hash function 228 and hash keys 278 used to detect corrupt components in act 304. However, it is possible to use a validation process independent of hash function 228, and any suitable validation technique may be used, such as a certificate or signature accompanying the repair files. Moreover, different validation techniques may be used for different files or different types of files. For example, a manifest 276 may be validated differently than a payload file 274.

If the validation act uses the same hash function 228, then the process is very similar to that shown in FIG. 6. Each received file is hashed by hash function 228 and the resulting value is compared to the stored hash key 278. If the value returned by the hash function 228 matches the hash key 278, then the repair file 298 is presumed valid.

The final act 314 of the process illustrated in FIG. 3 is to repair the corrupt component. In some embodiments, this can be achieved by overwriting the corrupt files 274 by deleting the corrupt files 274 and replacing them with the repair files 298. More complicated repair processes are also possible, such as selecting particular information from the repair file 298 to repair a specific part of the corrupt file 274. Regardless of the specific repair process used, it may be performed for every file that has been determined to need repair in act 308. Though, in some embodiments, different types of files or types of errors may be identified and may be accorded different repair priorities such that not all corrupt files must be repaired at one time. Once all the files requiring repair have been repaired in act 314, the component repair service 222 software stops executing at act 316.

The embodiments as described identify and repair individual corrupt files associated with a corrupt component. While such an approach may allow a repair to be performed quickly while consuming a relatively small amount of network bandwidth, it is not a requirement that components be repaired at the file level. Any suitable unit of software may be identified as corrupt and repaired. In some embodiments, only the smallest piece needed for repair is downloaded. The smallest unit available to download can be any size unit of the overall software environment being repaired. The smallest unit being downloaded may be the entire component, an individual file, or even a portion of a file that needs repair. In some embodiments, the entire file may not need to be downloaded, but instead just a portion of a file is downloaded.

Further, the embodiments describe an operating system being repaired. It should be recognized that any software, including applications, may be updated using techniques as described herein.

Figure 4:
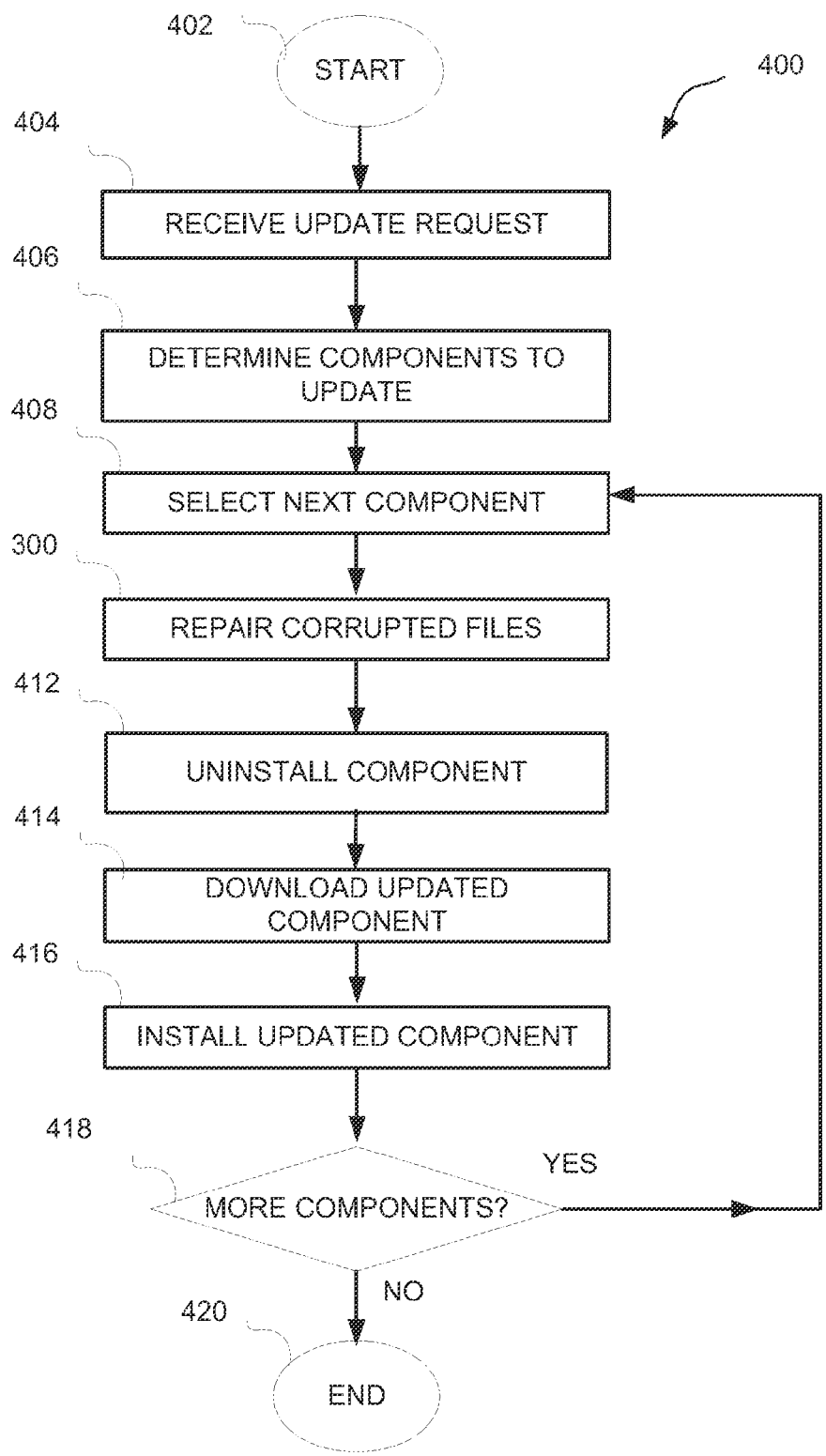
FIG. 4 is a flow chart of an exemplary process of updating corrupt software in some embodiments of the present invention.

In a further embodiment of the invention, the component repair service 222 can be used in conjunction with a software updating service 224 to provide seamless software updates with minimal user interaction. An embodiment of this method is shown in FIG. 4. The software updating service 224 can start 402 in any suitable way. For example, it may start automatically, based on a timed schedule or when updates become available, or it can be manually initiated by a user 101 of the computer system 210.

The software updating service 224 then receives a request to update certain software at act 404. The request may come from a user 101, from the OS 134, from an application program 135, from other program modules 136 or possibly from an external source, such as an external update server that provides information about available updates. The software updating service 224 determines which components to update at act 406. The request to update software may specify specific components 270 that should be updated. It may, alternatively, have a set of rules to determine which software to update. For example, the request could indicate that updates should be performed on all components that have not been updated recently. In a further embodiment, the software update service 224 may check for updates on all components of the computer system 210 and update the components that have updates available. Accordingly, the specific event that triggers an update and the specific components updated are not critical to the invention.

Once the components to update have been determined in act 406, the software updating service 224 will select one of the components 270 and repair the corrupt files in act 300. This act may be the same as the component repair service 222 process that was described in detail in conjunction with FIG. 3. This process may be performed by the component repair service 222. If the component that is being updated is corrupt, it must first be repaired by the component repair service 222.

After being repaired, the component 270 is no longer corrupt and the component 270 may be uninstalled properly at act 412. Uninstalling the component may include updating the registry 230, changing and/or deleting files 272-276 associated with the component and other administrative tasks. At act 414, the updated version of the component is downloaded from an external server 280. These components may be part of packages 291 located in a package storage unit 290. The updated component is then installed at act 416.

If there are more components requiring updating, as determined at act 418, then the software updating service 224 will return to act 408, select the next component to update and repeat the updating procedure for each remaining component. The software updating service 222 is terminated at act 420 once all of the components determined to need updating have been updated.

Note that the order of the acts in FIG. 4 is not limited to the order presented therein. For example, downloading the updated component in act 414 could occur at any previous point in the process. Furthermore, acts in the process may be performed simultaneously. For example, the downloading of the components in act 414 could occur while the corrupt components are being repaired in act 300. Also, each component does not have to be updated in its entirety before moving on to the next component. Instead, all of the acts could be performed simultaneously for every component that is being updated by the software updating service 224.

In yet another embodiment, repairs to corrupt files can cascade. For example, if the metadata file 276 is corrupt, then it cannot be relied on to supply a valid hash key 278 in order to detect corruption in payload file 274. Therefore, the metadata file 276 must be repaired first. Once it is repaired, then the component repair service 222 can use the hash key 278 to check the payload 274 for corruption and complete the repair process for payload 274.

In the previously discussed embodiments, the components 240, 250, 260 and 270 of an OS that is presently being executed are being repaired. In such an embodiment, access to any component that is being repaired or updated may be blocked. Any component to which access can be temporarily blocked may thus be updated, even while the OS is in use. However, in an alternative embodiment, an executing OS may repair components of images of a separate OS that is not currently being executed by a computer system. This may be achieved by allowing a currently executing OS to use its component repair service on files in an OS image that is stored in storage device 210 or some other external or removable storage medium.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computing device comprising:
   at least one processor;
   memory coupled to the at least one processor and comprising computer-executable instructions that, based on execution by the at least one processor, configure the computing device to:
   determine, based on a comparison of a hash of a file of a component to a cryptographically secure hash of an uncorrupt version of the file, that the file is corrupt, where the uncorrupted version of the file is stored on another device that is separate from the computing device;
   download, from the another device in response to determining that the file is corrupt, the uncorrupted version of the file;
   validate, in response to downloading the uncorrupted version of the file, the downloaded version of the file resulting in a determination that the validated version of the file is authentic and safe to install;
   overwrite, in response to validating the downloaded version of the file, the corrupt file with the downloaded version of the file resulting in the component being repaired; and
   install, after overwriting the corrupt file with the downloaded version of the file, an updated version of the repaired component.

2. The computing device of claim 1 further configured to generate, via the at least one processor, the hash of the file.

3. The computing device of claim 1 further configured to determine that the component needs to be updated to a newer version.

4. The computing device of claim 1 further configured to download, prior to installing the updated version of the repaired component, the updated version of the repaired component.

5. The computing device of claim 1 further configured to repair the component in response to an indication that software including the component is compromising integrity of the another device.

6. A method performed on a computing device, the method comprising:
- determining, by the computing device based on a comparison of a hash of a file of a component to a cryptographically secure hash of an uncorrupted version of the file, that the file is corrupt, where the uncorrupted version of the file is stored on another device that is separate from the computing device;
- downloading, by the computing device from the another device in response to the determining that the file is corrupt, the uncorrupted version of the file;
- validating, by the computing device in response to the downloading the uncorrupted version of the file, the downloaded version of the file resulting in a determination that the validated version of the file is authentic and safe to install;
- overwriting, by the computing device in response to the validating the downloaded version of the file, the corrupt file with the downloaded version of the file resulting in the component being repaired; and
- installing, by the computing device after the overwriting the corrupt file with the downloaded version of the file, an updated version of the repaired component.

7. The method of claim 6 further comprising generating, by the computing device, the hash of the file.

8. The method of claim 6 further comprising determining, by the computing device, that the component needs to be updated to a newer version.

9. The method of claim 6 further comprising downloading, by the computing device prior to installing the updated version of the repaired component, the updated version of the repaired component.

10. The method of claim 6 further comprising repairing, by the computing device, the component in response to an indication that software including the component is compromising integrity of the another device.

11. At least one memory device that comprises computer-executable instructions that, based on execution by a computing device, configure the computing device to perform actions comprising:
- determining, based on a comparison of a hash of a file of a component to a cryptographically secure hash of an uncorrupted version of the file, that the file is corrupt, where the uncorrupted version of the file is stored on another device that is separate from the computing device;
- downloading, by the computing device from the another device in response to the determining that the file is corrupt, the uncorrupt version of the file;
- validating, by the computing device in response to the downloading the uncorrupted version of the file, the downloaded version of the file resulting in a determination that the validated version of the file is authentic and safe to install;
- overwriting, by the computing device in response to the validating the downloaded version of the file, the corrupt file with the downloaded version of the file resulting in the component being repaired; and
- installing, by the computing device after the overwriting the corrupt file with the downloaded version of the file, an updated version of the repaired component.

12. The at least one memory device of claim 11, the actions further comprising generating the hash of the file.

13. The at least one memory device of claim 11, the actions further comprising determining that the component needs to be updated to a newer version.

14. The at least one memory device of claim 11, the actions further comprising downloading, prior to installing the updated version of the repaired component, the updated version of the repaired component.

15. The at least one memory device of claim 11, the actions further comprising repairing the component in response to an indication that software including the component is compromising integrity of the another device.

* * * * *